US006044201A

United States Patent [19]

Van Turnhout

[11] Patent Number: 6,044,201

[45] Date of Patent: Mar. 28, 2000

[54] CONTAINER WITH HEAT OR COLD DISPENSING MATERIAL COMPRISING HYDROGEL WITH CROSSLINKED HYDROPHILIC POLYMER

[75] Inventor: Jan Van Turnhout, Pijnacker, Netherlands

[73] Assignee: Technische Universiteit Delft, Delft, Netherlands

[21] Appl. No.: 09/142,084

[22] PCT Filed: Mar. 3, 1997

[86] PCT No.: PCT/NL97/00102

§ 371 Date: Oct. 20, 1998

§ 102(e) Date: Oct. 20, 1998

[87] PCT Pub. No.: WO97/33950

PCT Pub. Date: Sep. 18, 1997

[30] Foreign Application Priority Data

Mar. 1, 1996 [NL] Netherlands ........................... 1002506

[51] Int. Cl.[7] ................................ C09K 5/00; C09K 5/06

[52] U.S. Cl. ...................... 392/346; 219/530; 126/263.05

[58] Field of Search ....................... 392/346; 126/263.01, 126/263.05–263.07, 910, 400; 219/530, 540; 165/DIG. 44, DIG. 47, DIG. 49, 104.17; 252/70

[56] References Cited

U.S. PATENT DOCUMENTS

| | | | |
|---|---|---|---|
| 4,042,012 | 8/1977 | Perry et al. | 126/400 |
| 4,209,413 | 6/1980 | Kent et al. | 252/70 |
| 4,273,667 | 6/1981 | Kent et al. | 126/400 |
| 4,619,778 | 10/1986 | Chalk et al. | 252/70 |
| 5,423,996 | 6/1995 | Salyer | 252/70 |

FOREIGN PATENT DOCUMENTS

| | | |
|---|---|---|
| 1 719 599 | 11/1995 | France . |
| 2719599 | 11/1995 | France . |
| 63-251489 | 10/1988 | Japan . |
| 675963 | 11/1990 | Switzerland . |
| 9311400 | 6/1993 | WIPO . |

*Primary Examiner*—John A. Jeffery
*Attorney, Agent, or Firm*—Young & Thompson

[57] ABSTRACT

A device for storing and gradually dispensing heat or cold includes a container having a partially heat-conducting wall enclosing a space with material having a high heat capacity including a semisolid hydrogel formed by a crosslinked hydrophilic polymer containing 90–99.5% of water, based on the sum of polymer and water.

10 Claims, 1 Drawing Sheet

CONTAINER WITH HEAT OR COLD DISPENSING MATERIAL COMPRISING HYDROGEL WITH CROSSLINKED HYDROPHILIC POLYMER

BACKGROUND OF THE INVENTION

The invention relates to a device for storing and gradually dispensing heat or cold, comprising a container having an at least partially heat-conducting wall which encloses a space in which a material having a high heat capacity is present.

DESCRIPTION OF THE RELATED ART

Such devices are known. A known example is a hot-water bottle, usually a sealable metal or rubber shell which is filled with hot water. Such bottles may leak and therefore carry the risk of scalding by the hot water. Particularly in the case of babies, the sick or the elderly this presents an unacceptable risk.

Safer alternatives to the hot-water bottle have been investigated for some time now. Thus, EP-A-290240 describes an electric heating device which consists of a block containing mineral powder in a polymer matrix and contained therein a heating element and the required electrical leads. In this case there is no risk of leakage, but the limited heat capacity and the high weight form drawbacks.

GB-A-2192118 discloses a bed heater which consists of a flexible container which is made of rubber or an elastomer and which contains a vegetable oil and is provided with electric heating means. The heat capacity of this heater is lower than that of a water bottle, and there is a similar risk of leakage.

U.S. Pat. No. 3,840,985 discloses a water bed heater which consists of two layers of styrene-butadiene rubber with electric heating wires installed in between these. In view of, among other factors, the low heat capacity, such a heater is virtually unsuitable as a heat-chargeable device.

SUMMARY OF THE INVENTION

We have now found a device for storing and dispensing heat or cold, which has a high heat capacity and cannot leak. The device according to the invention is characterized in that the material having a high heat capacity comprises a hydrogel formed by a hydrophilic polymer which contains or is able to contain 50–99.5 wt % of water, based on the sum of polymer and water.

DESCRIPTION OF THE PREFERRED EMBODIMENTS

The device according to the invention is not limited to being used as a substitute for hot-water bottles, but can also be used for the purpose of keeping meals, drinks and other materials and aids warm or cool.

Figure 1:
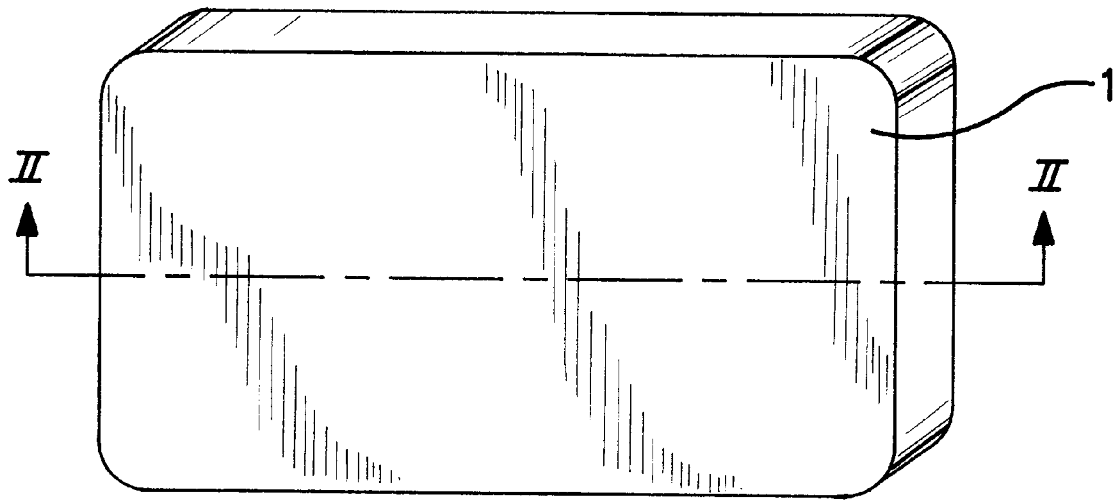
FIG. 1 is a plan view of the device and FIG. 2 is a cross-sectional view along II—II.
Figure 2:
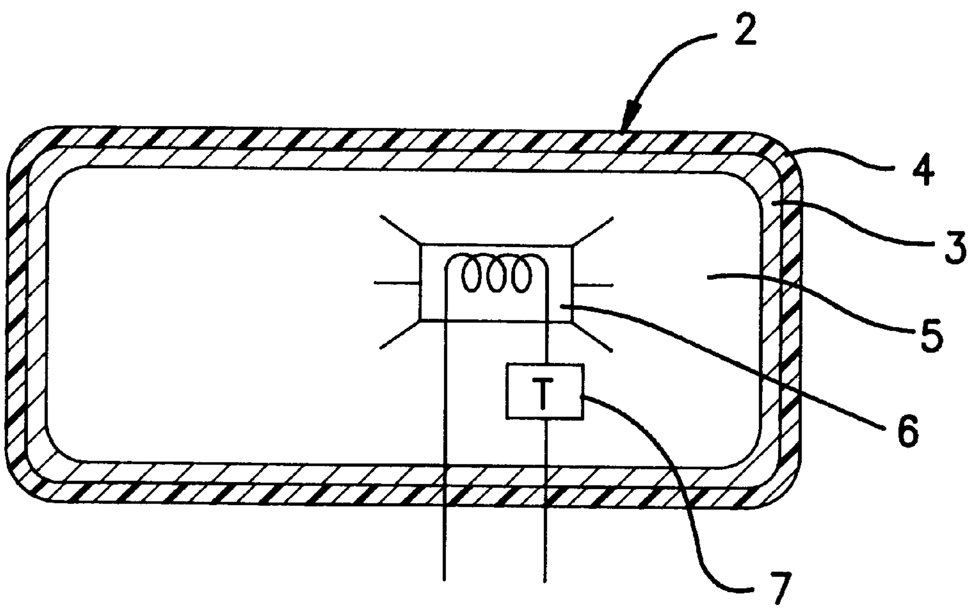

With reference to FIG. 1, the container (1) of the device may be made of any suitable material. What matters is only that the wall material (2) will withstand the temperatures at which it is used. Suitable materials are polyamide (PA, nylon), polycarbonate (PC), polyethylene terephthalate (PET), poly(ethylenenaphthalene) (PEN) and poly (oxymethylene) (POM). The container can then be shaped by, for example, blow-moulding, casting or extrusion. The material may also be a heat-resistant rubber or a metal, such as aluminium, stainless steel or chromium copper. It is also possible to use a metal (3) with a plastic coating (4) on top of it. The shape of the container can be varied without restrictions. Examples are cylinders, flat, triangular or square blocks, possibly rounded off, discs, rolls and the like. The container may also have the shape of a bowl or trough, so that materials are able to come into contact with the device on more than one side.

The hydrogel (5) is formed by a hydrophilic polymer which, as a result of hydrogen bond formation, has pronounced water-binding characteristics. The hydrophilic polymer can absorb at least its own weight in water. Preferably it can contain 75–99.5 wt %, in particular 90–99 wt % of water, based on the sum of polymer and water. The structure of the hydrophilic polymer must be such that the hydrogen bonds remain intact up to a temperature of about 80° C., preferably up to at least 90° C. Optionally, a hydrophilic organic solvent such as an alcohol, acetone, glycol, glycerol or polyglycol may also be present, but preferably less than 20 wt %, in particular less than 5 wt %, of this is present, based on the water.

In particular, the hydrophilic polymer is a polymer or copolymer of (meth)acrylic acid or a salt thereof, alkyl or hydroxyalkyl (meth)acrylate, (meth)acrylamide, vinylpyrrolidone and/or vinyl alcohol, polyethylene glycol or an optionally cross-linked, optionally modified polysaccharide such as starch, cellulose, guar gum, xanthan and other polysaccharides and gums and derivatives thereof such as hydroxyethyl-, hydroxypropyl- or carboxymethyl-cellulose or -starch. Polysaccharides modified with (poly)acrylates are likewise suitable. Preferably, the hydrophilic polymer contains hydroxyalkyl (meth)acrylate units and/or (meth) acrylamide units, where the (meth)acrylamide groups may be N-alkylated or N-hydroxyalkylated. Examples of monomers of which the hydrophilic polymer may be composed are, in particular, hydroxyethyl methacrylate and also hydroxypropyl methacrylate, dihydroxypropyl methacrylate, hydroxyethoxyethyl methacrylate, also ethoxylated analogues thereof, di(hydroxyethyl)aminoethyl methacrylate, methacrylamide, N,N-dimethylmethacrylamide, N-hydroxyethylmethacrylamide, N,N-bis(hydroxyethyl)methacrylamide, methacrylic acid, methyl methacrylate and the corresponding acrylates and acrylamides, N-vinylpyrrolidone and the like. They may be crosslinked with, for example, 0.1–2 wt % of ethylene dimethacrylate, oxydiethylene dimethacrylate, trimethylolpropane trimethacrylate, N,N-methylenebismethacrylamide and the like. Also suitable is a crosslinked polymer containing carbamoyl and carboxyl units having the formula >C(CONH$_2$)—C(COOH)<, which can be obtained by a polymer with maleic anhydride groups such as a vinyl methyl ether/maleic anhydride copolymer crosslinked with $C_9H_{18}$ chains being treated with ammonia.

The hydrogel is thus always in a semisolid state, so that liquid water cannot leak out even at elevated temperature. At the same time it has virtually the same high heat capacity as water.

To increase the heating-up rate of the device, it may also contain an electrolyte such as an inorganic or organic salt. Some salts have the drawback, however, that they do indeed increase the heating-up rate, but reduce the water absorption capacity of the hydrophilic polymer. It was found that certain salts such as tetraalkylammonium salts and especially lithium salts cause virtually no reduction in the absorption capacity and at the same time markedly increase the heating-up rate. Preferably, a lithium salt such as lithium sulphate, lithium chloride or lithium hydroxide is therefore present in an amount of, for example, 0.1–20 wt % (based on total weight).

The heat capacity of the device can be further increased by the presence of a substance having a high heat of crystallization such as Glauber salt (sodium sulphate decahydrate) or disodium hydrogen phosphate dodecahydrate, in a concentration of from about 10 wt % up to close to the saturation value.

The device according to the invention can be heated up in various ways. The device may, for example, be put into an oven or some other heated space, a timer optionally being used to prevent overheating. Particularly conveniently, heating is effected with the aid of microwaves because these, thanks to the water dipoles, can bring about particularly rapid heating up. The heating-up rate by means of microwaves can be further increased by the presence of polar and/or conductive substances such as carbon black or a water-soluble, organic, conductive polymer. Examples of the latter are, in particular, polypyrrole, polythiophene and polyaniline, but also polyfuran, polyimidazole and polyacetylene, which are provided with hydrophilic groups such as hydroxyalkyl, carboxylate or ammonium groups.

Heating up of the device can advantageously also be carried out electrically, preferably by means of a standard electric heating element (6). A suitable element is a so-called PTC element (PTC=positive temperature coefficient). Overheating is prevented by such an element as a result of the conductivity decreasing at higher temperature. Optionally, a further thermostat safety device (7) in the form of a bimetal can be employed. The rating of the electric heater obviously primarily depends on the dimensions and the desired capacity of the calorific device. The device may be provided internally with heat-spreading structures such as star- or cross-shaped bulkheads or fins, via which heating can proceed more effectively. The device in this arrangement further has an electrical connection, for example in the form of a plug, which can be uncoupled once heating up has been effected.

Electric heating can also be carried out directly, for example by making use of a structure having heat-resistant fibres which are coated with a conductive polymer and are connected directly to contact electrodes. Coating can be effected, for example, by means of aqueous dispersions of the above-described conductive polymers (polypyrrole and the like). An advantage of this is that many conductive branches run through the hydrogel, which result in uniform heating. After the addition of a conductive polymer to the hydrogel, strip-shaped or rod-shaped electrodes can be fitted which, if required, are locally sheathed with insulation to restrict the passage of current through the gel and prevent local overheating. In this arrangement, again, a thermostat controller is advantageously incorporated, for example in the form of a bimetal. It may also be beneficial to fit a temperature indication in the form of a colour indicator (tape) of a tell-tale lamp, so that a safe maximum temperature is always ensured.

The device according to the invention can be used for the purpose of keeping the human or animal body or parts thereof warm, in the form of a bottle, cylinder, blanket or bed. The device may also serve as a heat source for other materials, such as hair (rollers), food, plates (catering) and the like.

The device according to the invention can be used not only as a chargeable source of heat but also as a source of cold, for example to be used for cooling drinks or other comestibles, or for medical applications. For this purpose use is made of the large heat capacity of the absorbed water and moreover of the latent heat of melting between 0 and −10° C. Cool-down can, for example, be effected in a freezer compartment. The device may have various forms such as a cylinder, block, plate and the like and hold varying capacities.

What is claimed is:

1. Device for storing and gradually dispensing heat or cold, comprising a container having an at least partially heat-conducting wall which encloses a space in which a material having a high heat capacity is present, characterized in that the material having a high heat capacity comprises a semisolid hydrogel formed by a crosslinked hydrophilic polymer which contains 90–99.5 wt % of water, based on the sum of polymer and water.

2. Device according to claim 1, wherein the hydrophilic polymer contains less than 5 wt % of organic solvent, based on the amount of water.

3. Device according to claim 1, wherein the hydrophilic polymer is a polymer or copolymer of (meth)acrylic acid or a salt thereof, alkyl or hydroxyalkyl (meth)acrylate or alkyl or hydroxyalkyl (meth)acrylamide, vinylpyrrolidone or vinyl alcohol, polyethylene glycol or a modified polysaccharide.

4. Device according to claim 1, wherein an electrolyte is also present.

5. Device according to claim 4, wherein said electrolyte is a lithium salt.

6. Device according to claim 1, wherein a salt having a high heat of crystallization is also present.

7. Device according to claim 6, wherein said salt is a Glauber salt.

8. Device according to claims 1, wherein a conductive organic polymer or carbon black is present in the hydrogel.

9. Device according to any one of claim 1, the device additionally comprising means for electric heating.

10. Device according to claim 9, wherein the heating means comprise an electrical element and a thermostat.

* * * * *